US010102212B2

(12) United States Patent
Zizka et al.

(10) Patent No.: US 10,102,212 B2
(45) Date of Patent: Oct. 16, 2018

(54) REMOTE ARTIFACT REPOSITORY

(75) Inventors: Ondrej Zizka, Brno (CZ); Lukas Fryc, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 84 days.

(21) Appl. No.: 13/607,342

(22) Filed: Sep. 7, 2012

(65) Prior Publication Data

US 2014/0074849 A1    Mar. 13, 2014

(51) Int. Cl.
*G06F 17/30* (2006.01)

(52) U.S. Cl.
CPC .............. *G06F 17/30091* (2013.01)

(58) Field of Classification Search
CPC ............................. G06F 17/30106
USPC ........................................ 707/741
See application file for complete search history.

(56) References Cited

U.S. PATENT DOCUMENTS

| | | | | |
|---|---|---|---|---|
| 6,085,199 A | * | 7/2000 | Rose | G06F 17/30179 707/823 |
| 6,092,100 A | * | 7/2000 | Berstis et al. | 709/203 |
| 6,493,871 B1 | * | 12/2002 | McGuire | G06F 8/65 717/169 |
| 2003/0225925 A1 | * | 12/2003 | Kusterer et al. | 709/315 |
| 2004/0103406 A1 | * | 5/2004 | Patel | G06F 8/41 717/140 |
| 2006/0218623 A1 | * | 9/2006 | Hodges | H04L 63/0428 726/3 |
| 2009/0055809 A1 | * | 2/2009 | Campbell | G06F 8/36 717/140 |
| 2009/0083268 A1 | * | 3/2009 | Coqueret et al. | 707/6 |
| 2010/0064284 A1 | * | 3/2010 | Winter | G06F 8/70 717/169 |
| 2010/0223469 A1 | * | 9/2010 | Hussain | G06F 21/64 713/175 |
| 2012/0311534 A1 | * | 12/2012 | Fox et al. | 717/120 |
| 2013/0067427 A1 | * | 3/2013 | Fox et al. | 717/101 |

OTHER PUBLICATIONS

"How does Maven interact with different repositories?", Jul. 31, 2012, Stack Overflow, 2 pages.*
Tutorialspoint, Maven Repositories, Jul. 24, 2012, 2 pages.*

* cited by examiner

*Primary Examiner* — Cam-Linh Nguyen
(74) *Attorney, Agent, or Firm* — Lowenstein Sandler LLP (57) ABSTRACT

System for generating a pseudo-repository. The system scans a directory to detect compiled binary files, and assembles an index of the compiled binary files based on metadata describing the compiled binary files. Then the system generates a pseudo-repository based on the index that maps each compiled binary file with at least one associated artifact, wherein the pseudo-repository responds to client requests for one of the binary files.

15 Claims, 6 Drawing Sheets

REMOTE ARTIFACT REPOSITORY

TECHNICAL FIELD

Embodiments of the present invention relate to servicing queries for files, and more specifically to transparently servicing queries based on a particular file structure when the files are stored in a different structure.

BACKGROUND

Java software is often built using a Maven build tool. Maven is an example build automation tool that can also handle code in other languages besides Java. Maven repositories operate on a principle of uniqueness such that a certain URL always leads to the same software artifact. According to the Maven philosophy, testing is an integral part of the build process, and is tightly bound to the build process. So separation of the testing part for reuse with Java binary files created during the build process is usually difficult.

One workaround for this problem is to manually identify all dependencies needed by a particular test suite, manually locate their respective binary files, manually convert the binary files to a compatible file and directory structure, and set Maven to use the files. With a large or even modest project with dozens of dependencies, this manual approach has significant risk of introducing errors.

Large software packages are often distributed in a form of self-contained set of binary executable files and supporting files (e.g., configuration files, documentation files), collectively referred to as a "distribution". Another alternative is to pre-create a static local Maven repository based on metadata available from the distribution's binary files. However this approach also typically has several major disadvantages. First, these files, when not built using Maven build tool, usually do not contain proper metadata. Especially the version is often different from the official artifacts built using Maven. For example, the versions may have some string appended, or may be different, or can even be missing. Even if the versions are correct, this approach usually lacks flexibility, particularly with newer or different versions. The version stated in the metadata may not match the one needed by the test suite, and thus again, it would be often necessary to manually reconfigure the test suite's dependencies.

Another disadvantage of this approach is the files should typically be copied and moved, which can be tedious if performed manually and can be time consuming even if performed in an automated way.

BRIEF DESCRIPTION OF THE DRAWINGS

The present invention is illustrated by way of example, and not by way of limitation, in the figures of the accompanying drawings and in which.

DETAILED DESCRIPTION

Described herein is a system, a method and apparatus for scanning files such as Java binaries (.jar files) in an indicated directory or directories, indexing the files using available meta-information carried within them or using locations of the files as implicit descriptors of meta-information, and generating a pseudo-repository. In one embodiment, the pseudo-repository serves requests from Maven clients, the requests being formed based on an expectation that particular files are located in unique, defined locations. The pseudo-repository serves these requests transparently and translates the requests to the particular file locations of the binaries scanned. In this way, Maven clients are not modified to adapt to the new locations and structure of the files and directories. Maven clients simply request software artifacts via URLs formed in expectation of Maven-based file locations, and the pseudo-repository translates the client requests to the appropriate location, which does not necessarily match the URL or the Maven-based file locations. Then the pseudo-repository serves the appropriate file to the client, even though the file may not reside at the location indicated by the URL.

Maven is used herein in various example embodiments. Maven is a "build" system for Java software and other types of software. Maven handles all stages of the process of transforming source code to a final product. The final product can be a Java library (.jar file) to be used by other developers as a dependency, or a distribution bundle (.zip file) to be shipped to a final user, for example. While Maven is discussed as one example of a build system, the principles disclosed herein are equally applicable to other build systems (e.g., Apache Ant, Gradle, or PerlBuildSystem) and associated components.

In an embodiment, a Maven repository is a set of distinct, downloadable files organized in a tree hierarchy according to a set of rules. A simple example repository is primarily based on the HTTP protocol and is arranged according to a specific file and directory structure and hierarchy. Typically, a user interface is provided which presents a set of links which represent various directories and files, and following a particular link will either open an associated directory or fetch an associated file. A more advanced example repository with a web-based graphical user interface can provide a more 'native' style of file and directory navigation, but essentially provides the same type of access to the file architecture. Native clients can also browse such repositories using network requests for information about directory contents. Typically a user would access the graphical version or a native client for ease of use, while a build system would access the simple web-based version for ease of automation. According to embodiments, a Maven repository may be employed which may not have a tree structure, may not include a user interface, or be automatically browsable by software clients, however the pseudo-repository may be configured to serve the downloadable files based on requests for the content of a given URL.

Maven is based on many strict rules, which can make it hard to use plain .jar libraries from other, incompatible build systems as dependencies. Many software projects can have tens or even hundreds of .jar files which do not conform to these rules, causing administrative difficulties in integrating and accessing what would otherwise be compatible software packages. These other projects may conform to some other rules that are not compatible with Maven or may not have any particular rule structure if the project is manually managed.

A dependency is a file which is needed by another file to execute or operate properly. Some embodiments of this disclosure focus on these dependencies. When a software project is built using Maven, the software project has dependencies defined in terms of group, artifact, version, and so forth. Converting incompatible or legacy projects to match the format and structure that Maven expects can be a very complex task, typically involving a lot of manual work, analysis of old information, and reverse engineering. For example, several high profile attempts to convert large application platforms and software projects into a Maven repository have failed or been canceled because the effort is too time consuming.

The build process for Maven can divide every part of software into artifacts, which can depend on other artifacts. An artifact can be a file or part of a file. For example, in a software project, software artifacts can include libraries, build files, compiled software, debugging information, developer notes, dynamic-link libraries, configuration files, and so forth. A Maven repository can contain multiple versions of a same software artifact. The dependencies can be described in the project's build configuration file (pom.xml). This file can also contain a definition of "remote repositories", or HTTP servers, which provide the artifacts based on a so-called "Maven axis", which in one embodiment is made up of a groupId, artifactId, classifier, version and type. For example, a project might depend on the commons-lang library, then the project contains this in its build configuration file as shown in the example pom.xml file below:

```
<dependency>
    <groupId>commons-lang</groupId>
    <artifactId>commons-lang</artifactId>
    <version>2.5</version>
</dependency>
```

This build configuration file causes the Maven build tool to iterate through the list of configured repositories, and to query the repositories for the corresponding artifact. If the corresponding artifact is available, the Maven build tool downloads and uses the artifact as a dependency. For example, the above dependency definition would cause the Maven build tool to send HTTP request to the following URLs,
http://repo1.maven.org/commons-lang/commons-lang/2.5/commons-lang-2.5.jar
http://nexus.redhat.com/commons-lang/commons-lang/2.5/commons-lang-2.5.jar
and so forth until one of servers replies with HTTP code 200 or otherwise confirms the availability of the artifact.

Using a pseudo-repository, software projects do not need to follow these strict rules. The pseudo-repository departs from a strict and rigid definition of file locations and other directory structures, and instead, performs inference based on rules which may be project-specific, assumptions of default expectations, and guesses involving algorithms like best string match with threshold, and so forth. One example assumption is based on the fact that in such bundles, all dependencies needed to build a project using that bundle were either included, or at least very likely to be included. Based on that process, the pseudo-repository tries to serve the right dependency.

The pseudo-repository exploits the fact that an HTTP server can do anything with the URL requested by a client, and can return any content. In other words, the pseudo-repository, acting as an HTTP server, has the identification of the artifact requested incorporated in the path of the URL, and the pseudo-repository processes the URL to identify and return the appropriate artifact. Based on the information gathered during the indexing phase, the pseudo-repository can pick the right binary file from the file system and send that file to the client.

The pseudo-repository can further serve any version of the requested artifact, effectively bypassing the strict requirement of the project which requires the exact version built by the previous phases of the build process, thus allowing the use of arbitrary binaries without requiring reconfiguration of dependencies, so long as a compatible version of the binary is returned.

For example, the server would be started with a command such as:
   java-jar repo.jar<path-to-dist>
   Then, a client submits a request to a URL
   http://localhost:<port>/jars/org/jboss/myLib/myLib/5.1.9.GA/myLib-5.1.9.GA.jar
which makes the repository serve any appropriate .jar file with the implementation of the library myLib, for example:
   <path-to-dist>/common/lib/myLib-5.1.1-eap-signed.jar
   The internal implementation can allow the pseudo-repository to provide virtually anything as content, including creating, assembling, or packaging content on demand depending on configuration, previous requests, or request parameters, for example.

Thus, instead of a huge amount of manual work and resources invested to create a Maven structure with every software release and publish the structure on a real Maven repository, such as an online server which should be ready to serve request at any time, in some embodiments, only a single file with rule definitions is prepared for whole series of releases because the bundle structure and file names do not change.

Figure 1:
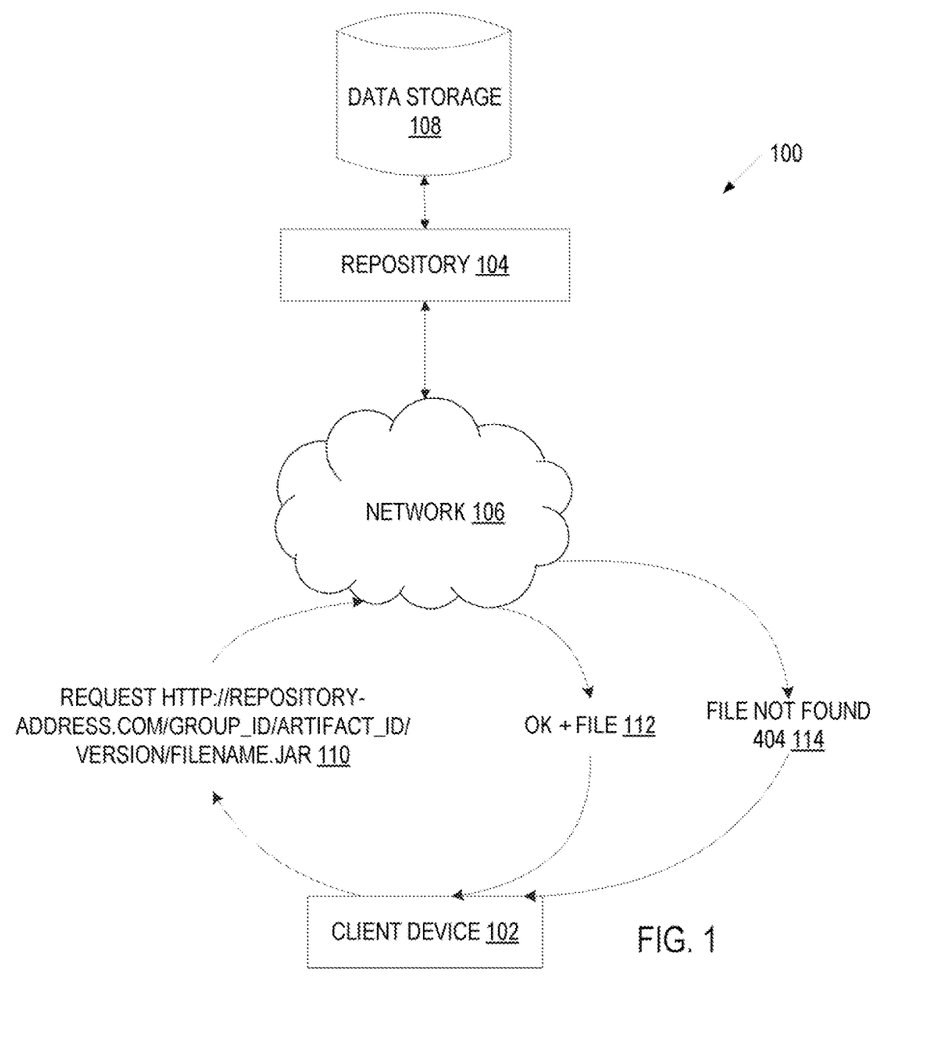
FIG. 1 illustrates a block diagram of an exemplary architecture for a client to retrieve data from a repository.

FIG. 1 illustrates a block diagram of an exemplary architecture 100 for a client device 102 to retrieve data from a repository. A client device, such as a desktop or laptop computer, a personal digital assistant (PDA), smart phone, tablet computing device, set-top box, or other device, makes a request 110 to a repository 104 for a file stored in a data storage 108. The request 110 can optionally go through a network 106. In one embodiment, the repository is a Maven repository, and the request is formed to be Maven compatible. For example, the request can be directed to a particular URL of the repository that indicates an expected file and an expected directory location of file in the data storage 108. The illustrative example request 110 shown in FIG. 1 is http://repository-address.com/group_id/artifact_id/version/filename.jar. The repository 104 receives the request 110. If the repository 104 can identify and serve the requested file, the repository 104 responds 112 OK and sends the file to the client device 102. If the repository 104 cannot locate the file or the file is otherwise unavailable, the repository 104 returns an error 114, such as a 404 FILE NOT FOUND error or other appropriate error.

In an embodiment, the repository 104 is hosted by a server computing device including a central processing unit (CPU) and memory. The memory may be configured to store instructions or a software package for the repository, any repository subsystems, and so forth. In an embodiment, the repository 104 represents a public or private web server that provides a web-based interface to the data storage 108 for client devices 102 via a public network or an intranet for example. However the repository 104 can provide other non-web network interactions with the client device 102, such as network interactions for requesting and serving file requests via API calls. When the repository 104 receives a request for a file that is not present in the data storage 108 at the location specified in the request 110, the repository 104 can still attempt to service the request 110. For example, the repository 104 can search for the same file at a different location, or search for a similar or compatible file at the same or a different location, and serve that to the client device 102 in response to the request 110. More details of how the repository 104 services requests for files that do not exist at the address specified in the request are provided with respect to FIG. 2.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "scanning", "assembling", "generating", "receiving", "returning", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

Figure 2:
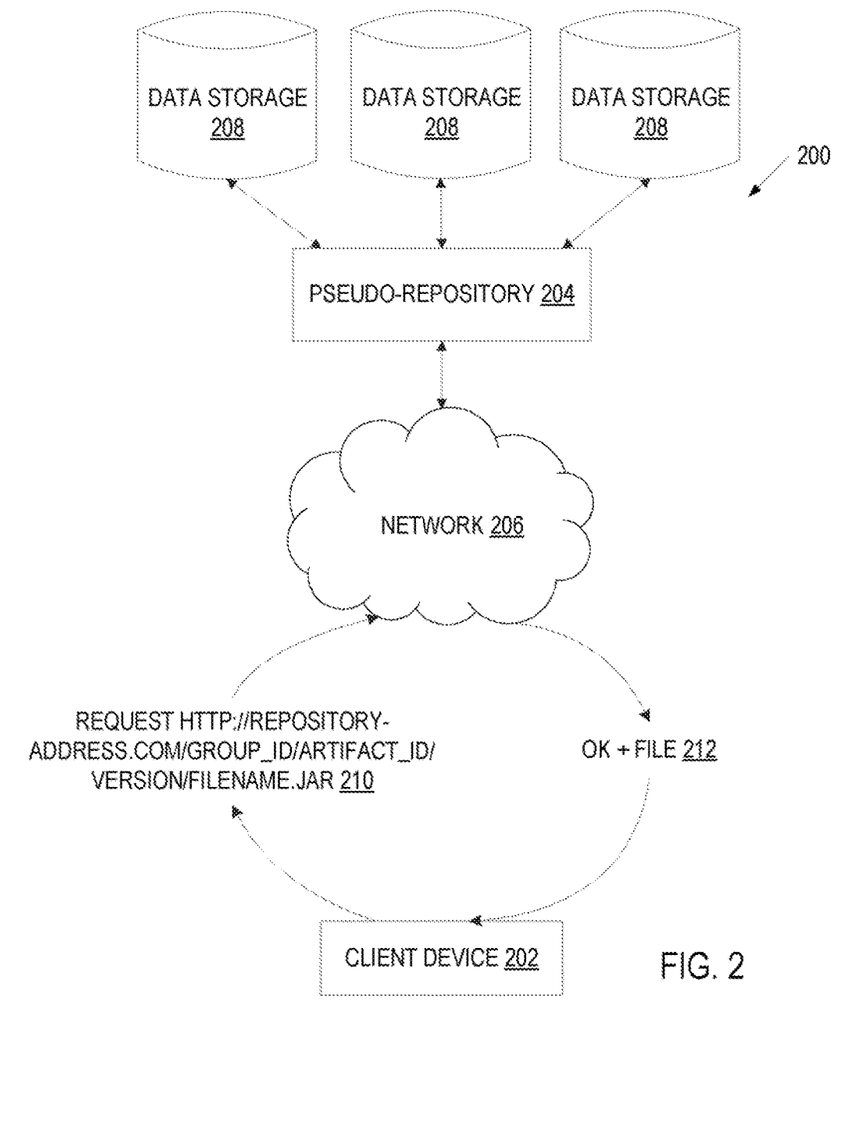
FIG. 2 illustrates a block diagram of an exemplary architecture for a client to retrieve data from a pseudo-repository via a translation subsystem.

FIG. 2 illustrates a block diagram of an exemplary architecture 200 for a client device 202 to retrieve data from a pseudo-repository 204, such as via a translation subsystem. A client device 202, such as a desktop or laptop computer, a personal digital assistant (PDA), smart phone, tablet computing device, set-top box, or other device, makes a request 210 to a pseudo-repository 204 for a file stored in a data storage 208. The pseudo-repository 204 can access files stored in multiple data storage devices 208 or in multiple different formats or directory and file structures. The request 210 can optionally go through a network 206. In one embodiment, the pseudo-repository 204 is a modified Maven repository or a Maven-compatible pseudo-repository, and the request is formed to be Maven compatible even though the structure and locations of files in the data storage 208 do not match the exact path indicated in the request 210. For example, the request can be directed to a particular URL of the repository that indicates an expected file and an expected directory location of file in the data storage 208. The pseudo-repository 204 receives the request 210, such as via a web server. The pseudo-repository 204 can identify the appropriate file based on the request, via a translation subsystem, even though the file does not actually exist at the location indicated in the request. If the pseudo-repository 204 can identify and serve the requested file, the pseudo-repository 204 responds 212 OK and sends the file to the client device 202. If the pseudo-repository 204 cannot locate the file or the file is otherwise unavailable, the pseudo-repository 204 returns an error message to the client device 202. The pseudo-repository 204 can serve files from the data storage 208 which do not match the exact address indicated in the request 210, but which do match the file or a compatible version of the file requested by the client device 202.

Figure 3:
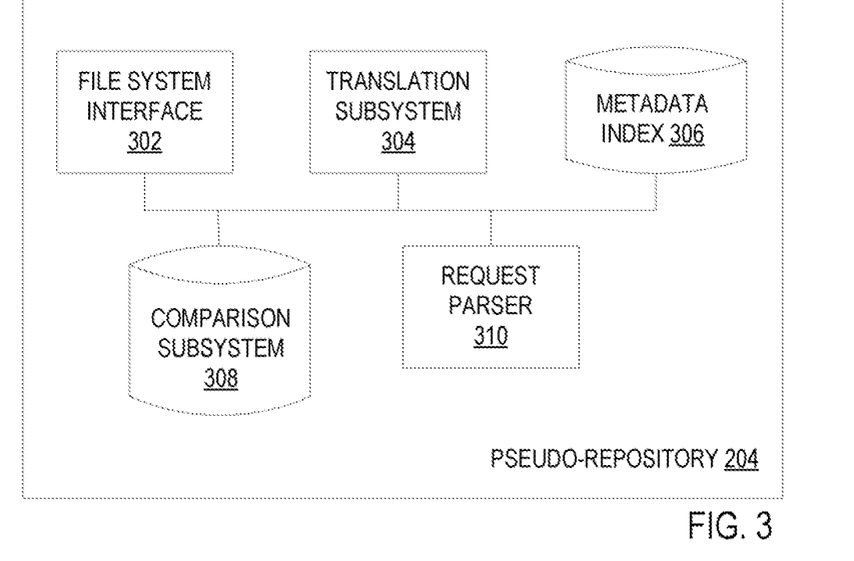
FIG. 3 illustrates a block diagram of an exemplary pseudo-repository.

FIG. 3 illustrates a block diagram of an exemplary pseudo-repository 204, as shown in FIG. 2. The pseudo-repository 204 can include a file system interface 302 for reading and writing to one or more file systems to scan, identify, and index files, and to fetch files for serving client requests.

The pseudo-repository 204 can include a translation subsystem 304 which translates requests into specific files in a data storage. The translation subsystem 304 can rely on a metadata index 306 that tracks metadata of files in the data storage and provides an index of available metadata and available files corresponding to the metadata. In this way, the translation subsystem 304 can look up in the metadata index 306 which file in the data storage corresponds to a particular request. The pseudo-repository 204 can also include a request parser 310 that extracts relevant information from the request of the client device. For example, the request parser 310 can parse the directory path and file name requested to determine which file is requested, which version is requested, and so forth, according to a Maven compatible request parsing scheme.

In some cases, the file requested may not be an exact match with the available metadata. A comparison subsystem 308 can analyze the available metadata, compatible file versions, and other information to determine whether an available file is sufficiently similar to provide as a response to a user query. The comparison subsystem 308 is optional and may not participate in serving each request. For example, the comparison subsystem 308 may be activated when an exact file match is not found. The comparison subsystem can compare the request and available files and metadata using a similarity threshold.

In one embodiment, the translation subsystem 304 further includes a provider and a mapper, not shown. A provider creates the content to provide, such as extracting files from an archive, concatenating files together, converting a file from one format to another, or compiling a source file. A provider is responsible for providing data for the response based on metadata in the request. The translation subsystem 304 can also include a mapper. A mapper converts the request to metadata describing what the client device requests to be provided as a response. A mapper examines the data sent by the client device in the request, and creates the proper metadata according to the purpose of the request based on information available about the request, information describing the client device, and any other available information.

Figure 4:
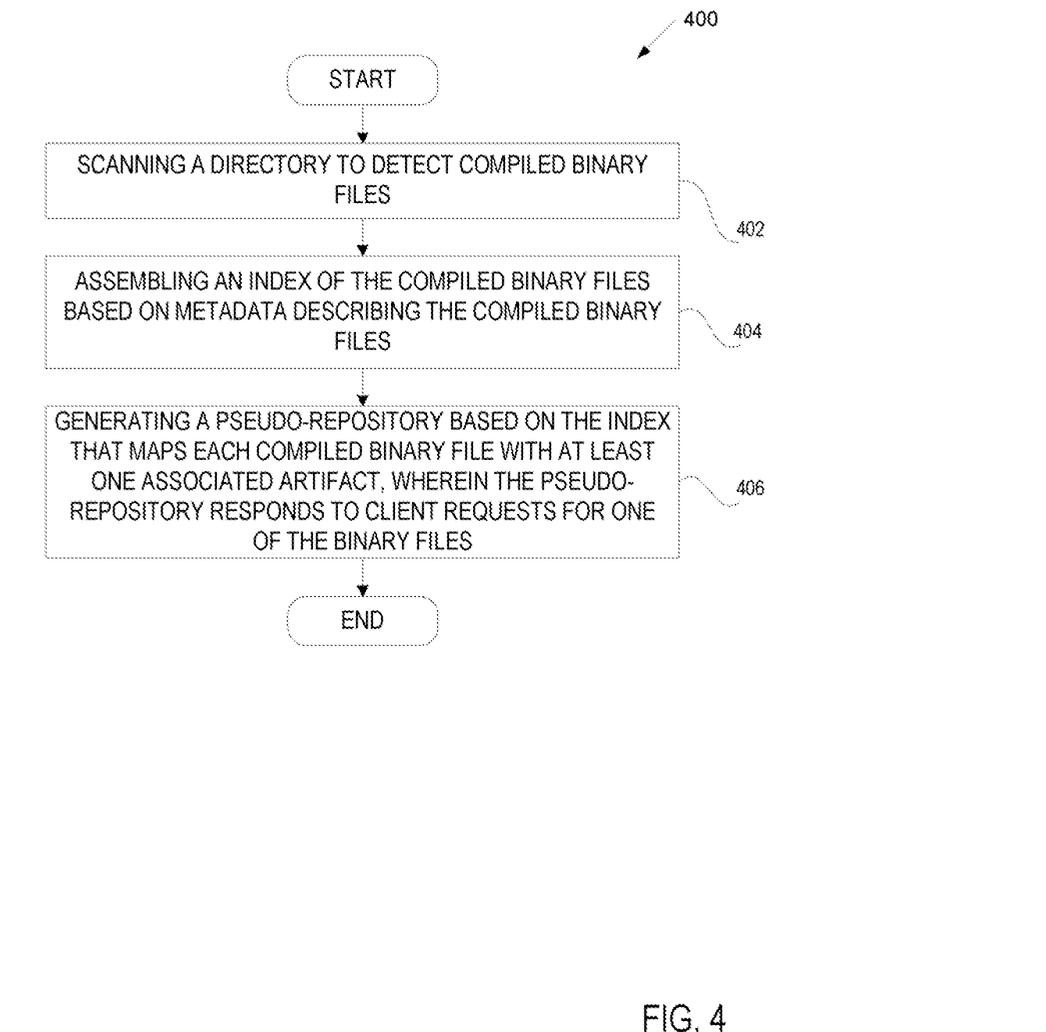
FIG. 4 illustrates a flow diagram of one embodiment of a method for generating a pseudo repository.

FIG. 4 illustrates a flow diagram of one embodiment of a method for generating a pseudo-repository. The method 400 is performed by processing logic that may comprise hardware (circuitry, dedicated logic, etc.), software (such as is run on a general purpose computer system or a dedicated machine), or a combination of both. In one embodiment, the method is performed by a server (e.g., the pseudo-repository 204 of FIG. 2).

The server scans, via a processing device, a directory to detect compiled binary files (402) or to detect metadata associated with the compiled binary files. The server can also detect dependencies between the compiled binary files and assemble an index of those dependencies. Then the server can respond to client requests based on the index of dependencies. While the examples herein discuss compiled binary files, the server can detect other software artifacts, such as intermediate files, configuration files, comments, build files, and other non-compiled software artifacts or digital assets.

The server assembles an index of the compiled binary files based on metadata describing the compiled binary files (404). The server can search for and analyze metadata describing the compiled binary files as part of assembling the index. Further, the server can identify a software project type of the compiled binary files, and assemble the index based on the project type. For example, another build tool may have generated the binary files according to its own directory structure, which can provide important clues in understanding the locations and purposes of files that may not have sufficient metadata otherwise. In some cases, the server can incorporate logic or a mapping algorithm to better understand the file structure of other build tools.

The server generates a pseudo-repository based on the index that maps each compiled binary file with at least one associated artifact, wherein the pseudo-repository responds to client requests for one of the binary files (406). The pseudo-repository can then service requests for compiled binary files that are not at a location indicated in the request. Client requests can indicate, as part of the path or as a request parameter, a group identifier, an artifact identifier, a classifier, a version, or a type of the file requested.

Figure 5:
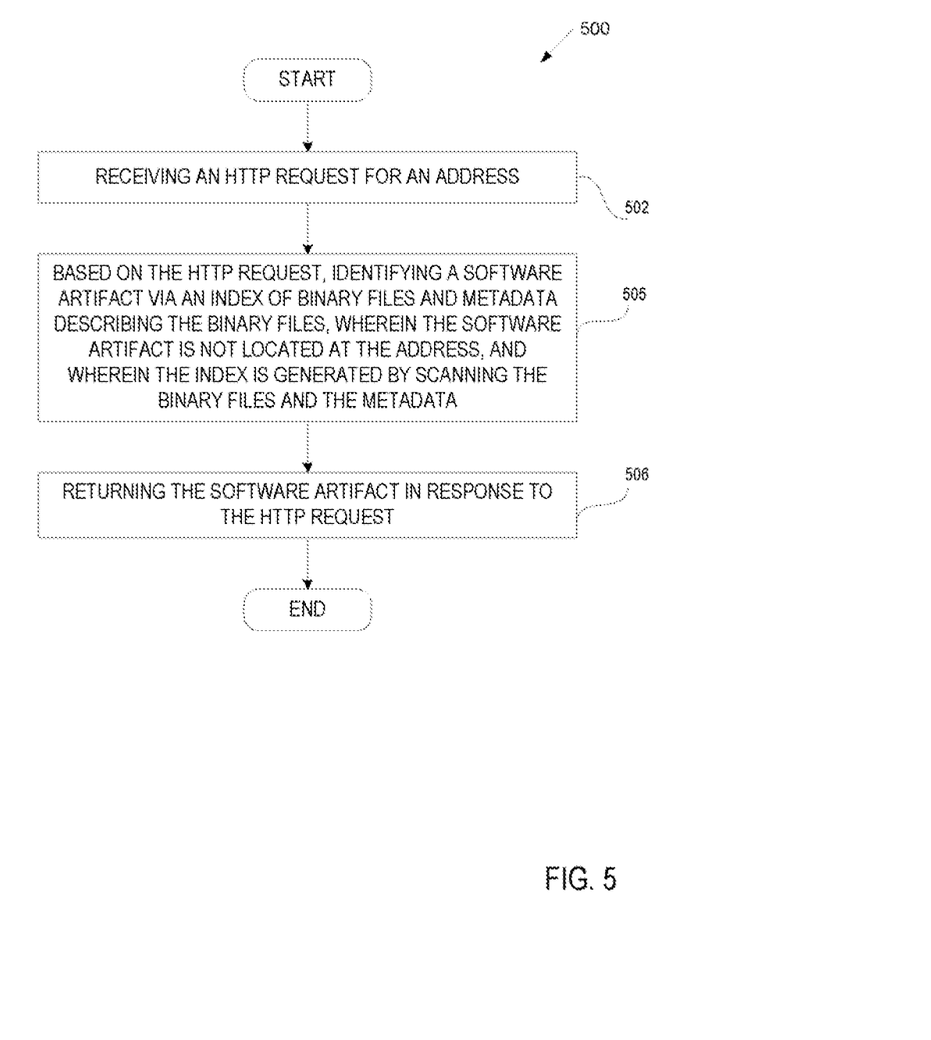
FIG. 5 illustrates a flow diagram of one embodiment of a method for servicing requests via a pseudo repository.

FIG. 5 illustrates a flow diagram of one embodiment of a method for servicing requests via a pseudo repository. The method 500 is performed by processing logic that may comprise hardware (circuitry, dedicated logic, etc.), software (such as is run on a general purpose computer system or a dedicated machine), or a combination of both. In one embodiment, the method is performed by a server (e.g., a pseudo-repository 204 of FIG. 2).

The server receives an HTTP request for a file at an address (502). The HTTP request can be based on an expected Maven-compatible location of a file. Thus, as far as the client device submitting the HTTP can detect, the server is a regular Maven compatible repository and serves and stores files according to the expected Maven file and directory structure, even though the files are actually stored in a different file and directory structure.

Based on the HTTP request, the server identifies a software artifact via an index of binary files and metadata describing the binary files, wherein the software artifact is not located at the address, and wherein the index is generated by scanning the binary files and the metadata (504). The index of binary files can cover different storage locations and file structures. When the server determines that an exact match for the HTTP request is unavailable, the server can perform a comparison of the HTTP request to available files based on a similarity threshold and return a best match software artifact in response to the HTTP request. Often a different version of the same file is a suitable replacement, and can be substituted by the server when the exact file requested is not available. The server can notify the requesting client device when serving a suitable replacement other than the exact file requested, such as a notification of the best match software artifact. The software artifact can be a library, a build file, a compiled binary file, debugging information, a developer note, a dynamic-link library, or a configuration file, for example.

The server returns the software artifact in response to the HTTP request (506) in a transparent way so that, from the client device perspective, the software artifact resides at the address indicated in the request. In some cases, the requested file is unavailable, but components from which the requested file can be assembled are available. So the server can identifying software artifact components and process the software artifact components to generate the software artifact. Some examples of this process include extracting a file from an archive, concatenating files together, extracting a portion of a file, decrypting a file, compiling a file, converting a file from one format to another format, and so forth.

The server can alternately scan a storage location for compiled binary files, assemble an index of the compiled binary files based on metadata describing the compiled binary files and ranges of compatible versions of the compiled binary files, generate a pseudo-repository based on the index that maps each compiled binary file with at least one associated artifact based on the ranges of compatible versions, and serve, via the pseudo-repository, client requests for files. Client requests can indicate a file location on the pseudo-repository, but the files do not actually reside at the indicated file location. The pseudo-repository translates the requests to a different location transparently by parsing a client request for a file to identify an expected location of the file and metadata describing the file. Then, based on the expected location and the metadata, the pseudo-repository locates a compiled binary file that corresponds to the client request, and serves the compiled binary file in response to the client request.

In one embodiment, quality assurance departments of software vendors often need to process a Maven project with "faked" dependencies where the actual .jar files are taken from a product's distribution, which are not in any Maven repository, and which may be in a .zip file or an RPM distribution for example. The pseudo-repository can solve this problem by scanning a given directory for .jar files, indexing the .jar files, and opening a server acting as a pseudo Maven repository, in the sense of serving the indexed .jar files. The embodiments set forth herein avoid the tedious, error-prone, and non-reusable process of manually identifying the libraries which the test suite depends on, and all their transitive dependencies, coding a shell script which installs all of them, one by one, to the local Maven repository, a file system directory with a special structure, and finally points the Maven build tool to use this repository.

Figure 6:
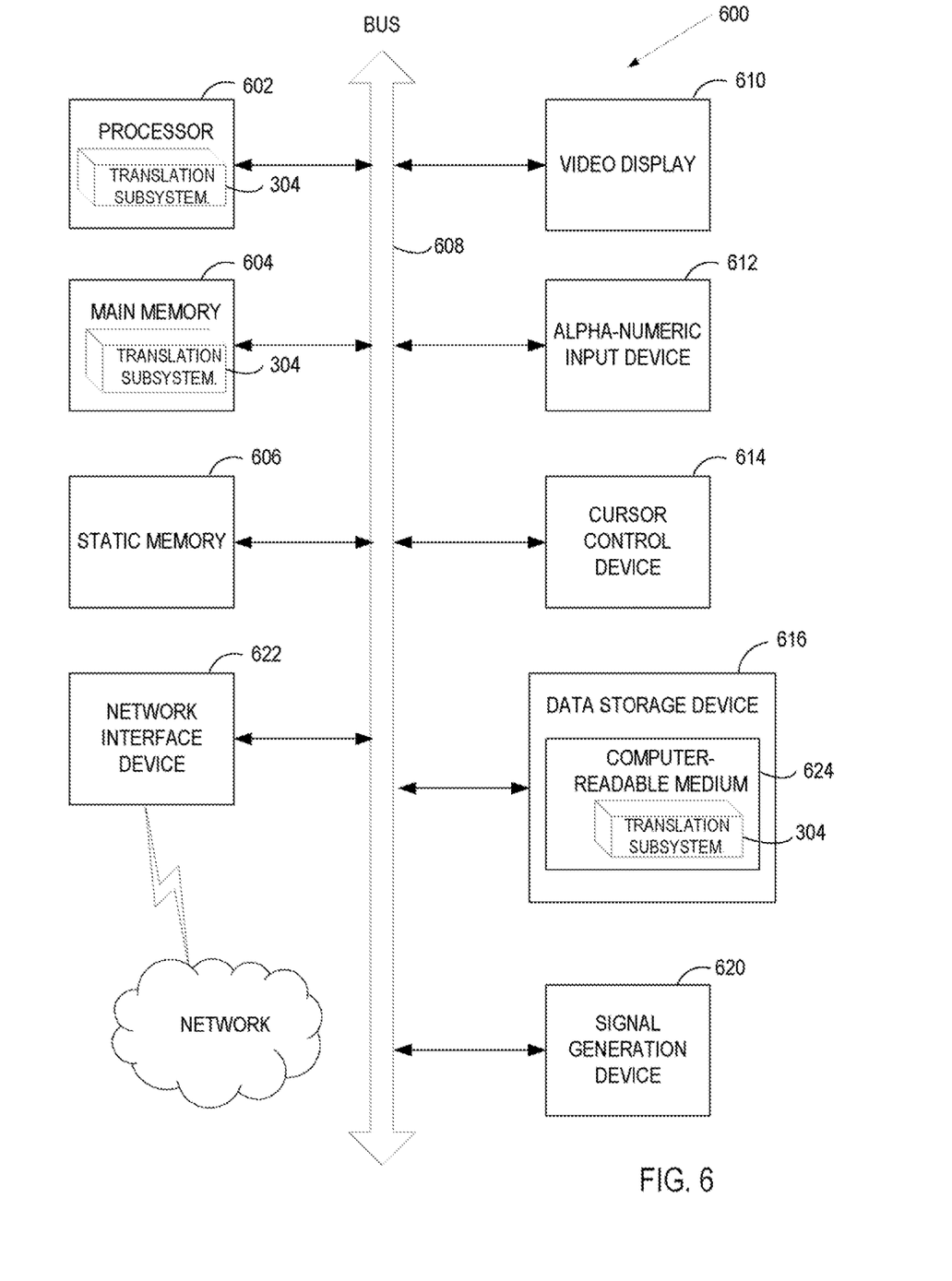
FIG. 6 illustrates a block diagram of an exemplary computer system, in accordance with one embodiment of the present invention.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 618 (e.g., a data storage device), which communicate with each other via a bus 608.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute processing logic (e.g., instructions for an translation subsystem 304) for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), other user input device such as a touch screen or a microphone, and a signal generation device 620 (e.g., a speaker).

The secondary memory 618 may include a machine-readable storage medium (or more specifically a computer-readable storage medium) 624 on which is stored one or more sets of instructions for the translation subsystem 304 embodying any one or more of the methodologies or functions described herein. The instructions 626 may also reside, completely or at least partially, within the main memory 604 or within the processing device 602 during execution thereof by the computer system 600, the main memory 604 and the processing device 602 also constituting machine-readable storage media.

The computer-readable storage medium 624 may also be used to store a problem resolution manager which may correspond to the translation subsystem 304 of FIG. 1), or a software library containing methods that call a translation subsystem 304. While the computer-readable storage medium 624 is shown in an exemplary embodiment to be a single medium, the term "computer-readable storage medium" should be taken to include a single medium or multiple media (e.g., a centralized or distributed database, or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A system comprising:
   a processing device; and
   a memory, operatively coupled to the processing device, having stored therein instructions which, when executed by the processing device, cause the processing device to:
   scan one or more directories to detect first metadata describing binary files each associated with one or more of a first plurality of software artifacts of a first data storage or with one or more of a second plurality of software artifacts of a second data storage, wherein the first plurality of software artifacts and the second plurality of software artifacts are associated with a software project;
   assemble a metadata index comprising the first metadata, the binary files associated with the first metadata, and one or more mappings of each of the binary files to the one or more of the first plurality of software artifacts of the first data storage or to the one or more of the second plurality of software
artifacts of the second data storage;
receive, from a client device via a network, a first
Hypertext Transfer Protocol (HTTP) request for a
first version of a first software artifact, wherein the
first version of the first software artifact is associated
with a first version of the software project, and
wherein the first HTTP request comprises a first
Uniform Resource Locator (URL) that identifies a
first file location in the first data storage for the first
version of the first software artifact and that includes
second metadata describing the first version of the
first software artifact;
determine that the first version of the first software
artifact does not reside at the first file location in the
first data storage;
translate the first HTTP request to the second data
storage, wherein translation comprises:
parsing the first URL for the second metadata
describing the first version of the first software
artifact; and
using the metadata index to identify the second data
storage in view of the second metadata describing
the first version of the first software artifact;
submit to the second data storage a first query for the
first version of the first software artifact;
determine, in response to the first query, that the first
version of the first software artifact does not reside in
the second data storage, and that a second version of
the first software artifact resides in the second data
storage, wherein the second version of the first
software artifact is associated with a second version
of the software project that precedes the first version
of the software project;
send, to the client device, the second version of the first
software artifact from the second data storage;
receive a second HTTP request for a first version of a
second software artifact, wherein the first version of
the second software artifact is associated with the
first version of the software project, and wherein the
second HTTP request comprises a second URL that
is different than the first URL and that identifies a
second file location for the first version of the second
software artifact;
in response to a determination that the first version of
the second software artifact resides at the second file
location, send, to the client device, the first version
of the second software artifact from the second file
location to cause a build of the project to be generated using the second version of the first software
artifact and the first version of the second software
artifact.

2. The system of claim 1, wherein the first software artifact comprises a library.

3. The system of claim 2, wherein the library is a dynamic-link library.

4. The system of claim 1, wherein the first software artifact comprises a compiled binary file.

5. The system of claim 1, wherein the first software artifact comprises debugging information.

6. A method comprising:
scanning one or more directories to detect first metadata
describing binary files each associated with one or
more of a first plurality of software artifacts of a first
data storage or with one or more of a second plurality
of software artifacts of a second data storage, wherein
the first plurality of software artifacts and the second
plurality of software artifacts are associated with a
software project;
assembling a metadata index comprising the first metadata, the binary files associated with the first metadata,
and one or more mappings of each of the binary files to
the one or more of the first plurality of software
artifacts of the first data storage or to the one or more
of the second plurality of software artifacts of the
second data storage;
receiving, by a processing device from a client device via
a network, a first Hypertext Transfer Protocol (HTTP)
request for a first version of a first software artifact,
wherein the first version of the first software artifact is
associated with a first version of the software project,
and wherein the first HTTP request comprises a first
Uniform Resource Locator (URL) that identifies a first
file location in the first data storage for the first version
of the first software artifact and that includes second
metadata describing the first version of the first software artifact;
determining, by the processing device, that the first version of the first software artifact does not reside at the
first file location in the first data storage;
translating the first HTTP request to the second data
storage, wherein translation comprises:
parsing the first URL for the second metadata describing the first version of the first software artifact; and
using the metadata index to identify the second data
storage in view of the second metadata describing
the first version of the first software artifact;
submitting to the second data storage a first query for the
first version of the first software artifact;
determining, in response to the first query, that the first
version of the first software artifact does not reside in
the second data storage, and that a second version of the
first software artifact resides in the second data storage,
wherein the second version of the first software artifact
is associated with a second version of the software
project that precedes the first version of the software
project;
sending, to the client device, the second version of the first
software artifact from the second data storage;
receiving, by the processing device, a second HTTP
request for a first version of a second software artifact,
wherein the first version of the second software artifact
is associated with the first version of the software
project, and wherein the second HTTP request comprises a second URL that is different than the first URL
and that identifies a second file location for the first
version of the second software artifact;
in response to a determination that the first version of the
second software artifact resides at the second file
location, sending, to the client device, the first version
of the second software artifact from the second file
location to cause a build of the project to be generated
using the second version of the first software artifact
and the first version of the second software artifact.

7. The method of claim 6 wherein the first software artifact comprises a library.

8. The method of claim 7, wherein the library is a dynamic-link library.

9. The method of claim 6 wherein the first software artifact comprises a compiled binary file.

10. The method of claim 6, wherein the first software artifact comprises debugging information.

11. A non-transitory computer-readable storage medium having stored therein instructions which, when executed by a processing device, cause the processing device to:

scan one or more directories to detect first metadata describing binary files each associated with one or more of a first plurality of software artifacts of a first data storage or with one or more of a second plurality of software artifacts of a second data storage, wherein the first plurality of software artifacts and the second plurality of software artifacts are associated with a software project;

assemble a metadata index comprising the first metadata, the binary files associated with the first metadata, and one or more mappings of each of the binary files to the one or more of the first plurality of software artifacts of the first data storage or to the one or more of the second plurality of software artifacts of the second data storage;

receive, by a processing device from a client device via a network, a first Hypertext Transfer Protocol (HTTP) request for a first version of a first software artifact, wherein the first version of the first software artifact is associated with a first version of the software project, and wherein the first HTTP request comprises a first Uniform Resource Locator (URL) that identifies a first file location in the first data storage for the first version of the first software artifact and that includes second metadata describing the first version of the first software artifact;

determine, by the processing device, that the first version of the first software artifact does not reside at the first file location in the first data storage;

translate the first HTTP request to the second data storage, wherein translation comprises:
  parsing the first URL for the second metadata describing the first version of the first software artifact; and
  using the metadata index to identify the second data storage in view of the second metadata describing the first version of the first software artifact;

submit to the second data storage a first query for the first version of the first software artifact;

determine, in response to the first query, that the first version of the first software artifact does not reside in the second data storage, and that a second version of the first software artifact resides in the second data storage, wherein the second version of the first software artifact is associated with a second version of the software project that precedes the first version of the software project;

send, to the client device, the second version of the first software artifact from the second data storage;

receive a second HTTP request for a first version of a second software artifact, wherein the first version of the second software artifact is associated with the first version of the software project, and wherein the second HTTP request comprises a second URL that is different than the first URL and that identifies a second file location for the first version of the second software artifact;

in response to a determination that the first version of the second software artifact resides at the second file location, send, to the client device, the first version of the second software artifact from the second file location to cause a build of the project to be generated using the second version of the first software artifact and the first version of the second software artifact.

12. The non-transitory computer-readable storage medium of claim 11 wherein the first software artifact comprises a library.

13. The non-transitory computer-readable storage medium of claim 12, wherein the library is a dynamic-link library.

14. The non-transitory computer-readable storage medium of claim 11 wherein the first software artifact comprises debugging information.

15. The non-transitory computer-readable storage medium of claim 11, wherein the first software artifact comprises a compiled binary file.

* * * * *